United States Patent [19]
Neff et al.

[11] 3,817,427
[45] June 18, 1974

[54] TOOTHPASTE TUBES AND SIMILAR TUBULAR CONTAINERS AND METHODS FOR THEIR MANUFACTURE

[75] Inventors: Robert O. Neff, Milwaukee; Kenneth V. Morrison, Brookfield; William D. Groechel, Whitefish Bay, all of Wis.

[73] Assignee: Milprint, Inc., Milwaukee, Wis.

[22] Filed: Dec. 27, 1971

[21] Appl. No.: 211,903

[52] U.S. Cl. .................................. 222/107, 220/77
[51] Int. Cl. ............................................ B65d 35/10
[58] Field of Search ........ 222/107, 92, 215; 156/69, 156/306; 220/75–80

[56] References Cited
UNITED STATES PATENTS

| | | | |
|---|---|---|---|
| 1,293,860 | 2/1919 | Mock | 222/92 |
| 2,214,422 | 9/1940 | Kronquest | 220/77 X |
| 2,274,258 | 2/1942 | Roselle | 222/107 |
| 2,430,046 | 11/1947 | Dreyfus | 222/107 |
| 2,476,446 | 7/1949 | Lindell | 222/107 |
| 2,876,725 | 3/1959 | Buck et al. | 156/306 |
| 2,965,964 | 12/1960 | Loew | 222/107 X |
| 3,578,524 | 5/1971 | Ignell | 156/69 |
| 3,599,837 | 8/1971 | Anderson | 222/107 |

FOREIGN PATENTS OR APPLICATIONS

| | | | |
|---|---|---|---|
| 164,932 | 9/1955 | Australia | 220/75 |

Primary Examiner—Stanley H. Tollberg

[57] ABSTRACT

Tubular containers comprising a tube of flexible packaging material joined to a closure member inserted in one end thereof. The closure member includes (1) an annular skirt to which the tube may be joined, and (2) a radially extending flange that extends around the circumference of the tube and projects beyond the exterior surface of the tube to form a portion that is adapted to be thermally reflowed around the end and exterior side portions of the tube to thereby conceal the junction of the tube and the closure member. Several methods for heat sealing the tube to the closure member are shown, including a heat seal between the exterior of the tube and a portion of the radially-extending flange. The tubular body may be made from a sheet of material folded into a tube with its edges joined together in a longitudinal seam, several forms having particular utility being shown herein. A method for the manufacture of tubular containers employing a closure member of the aforesaid construction includes the steps combining the tubular body and the closure member and thereafter reflowing the radially-extending flange about the outer surface of the tubular body through the application of heat.

2 Claims, 18 Drawing Figures

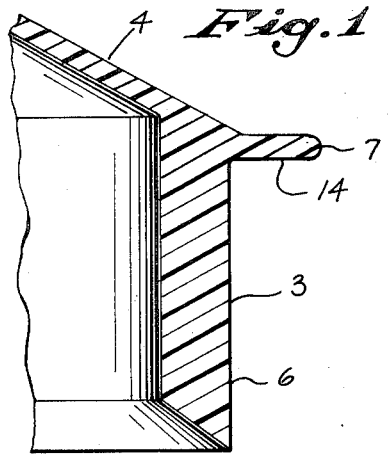
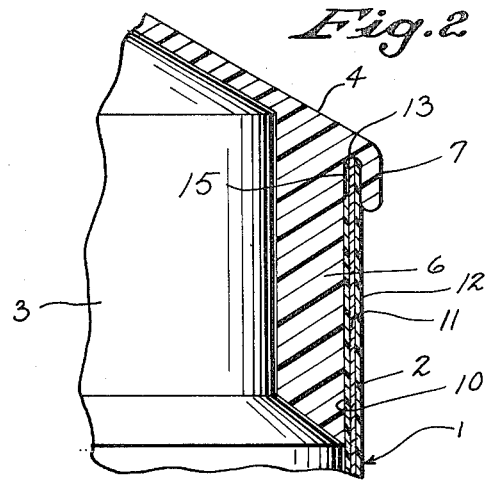
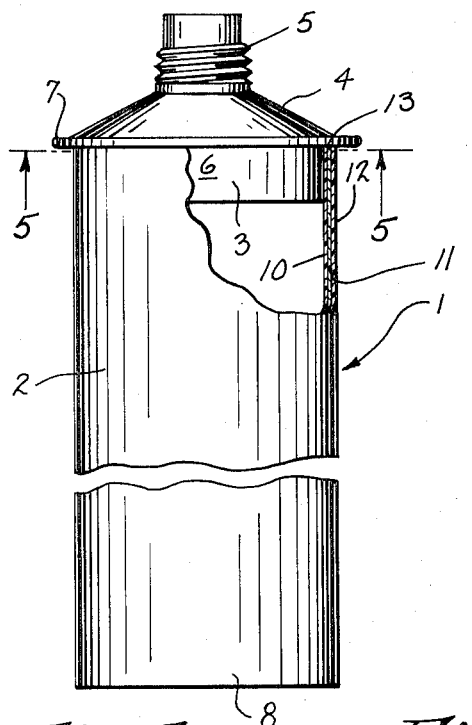
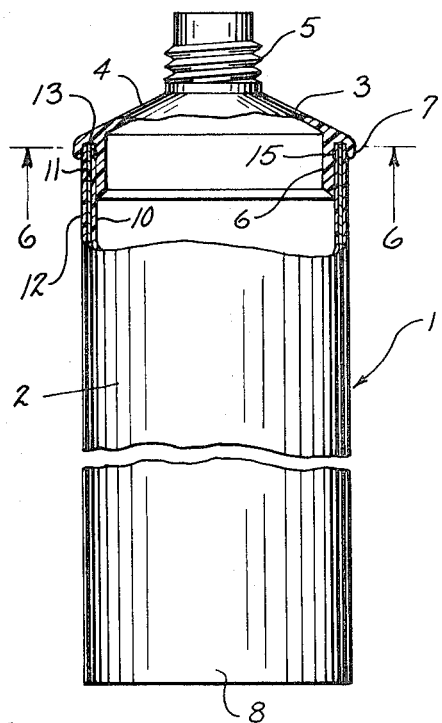
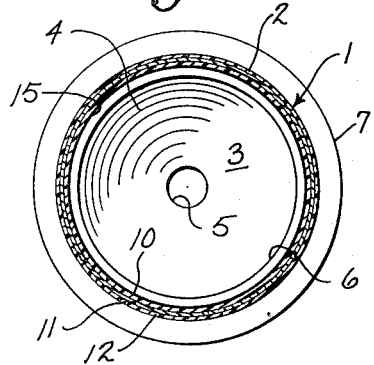
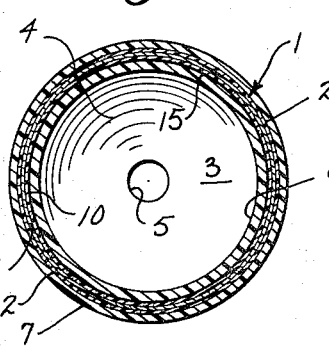
INVENTORS
ROBERT O. NEFF
KENNETH V. MORRISON
WILLIAM D. GROECHEL
BY Donald J Carse
ATTORNEY

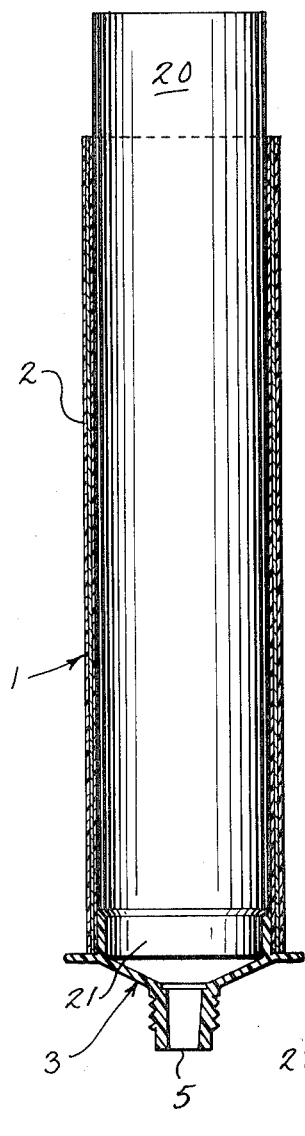
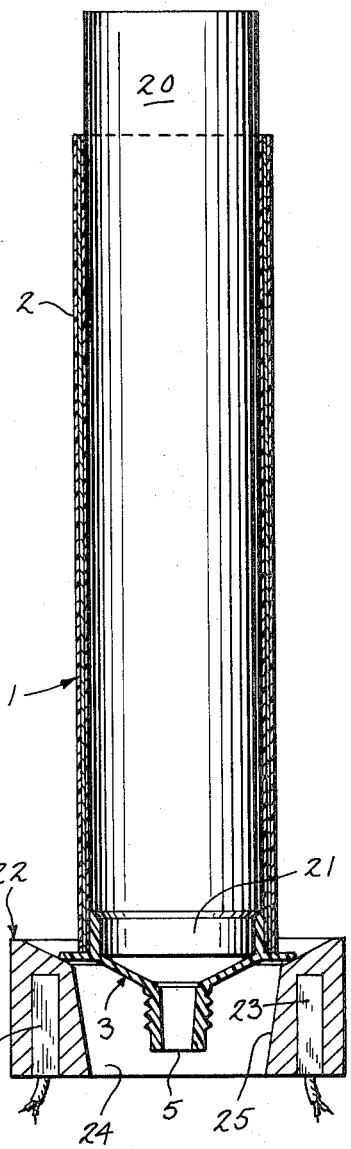
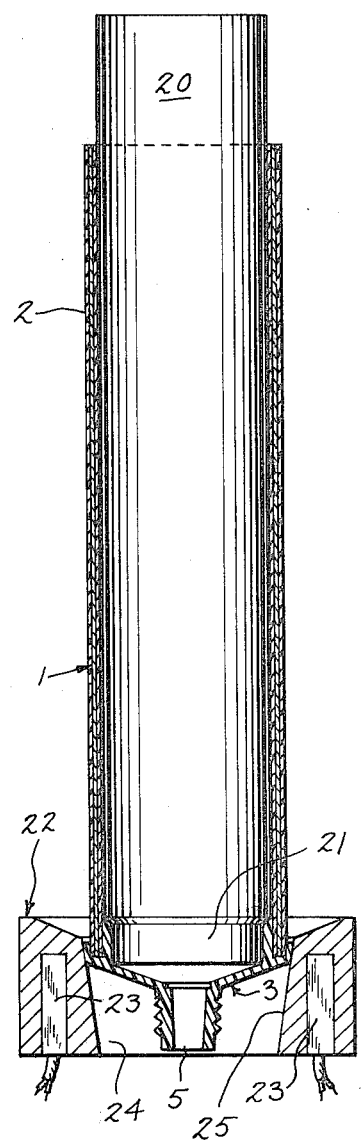
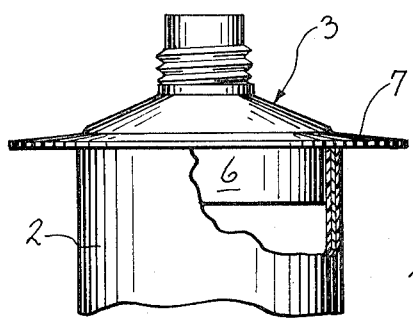
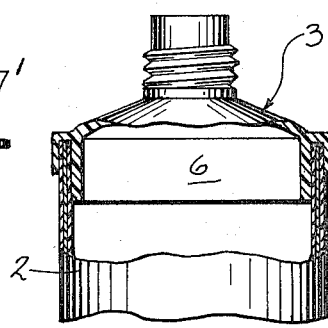
INVENTORS
ROBERT O. NEFF
KENNETH V. MORRISON
WILLIAM D. GROECHEL
ATTORNEY

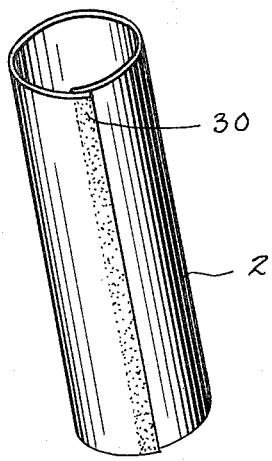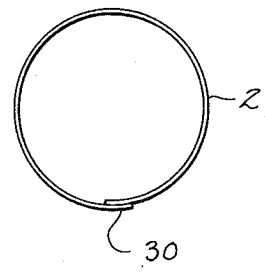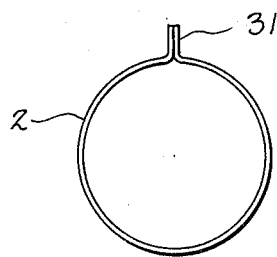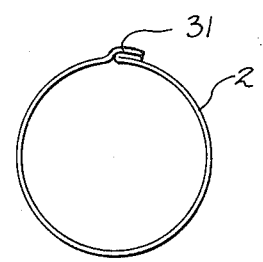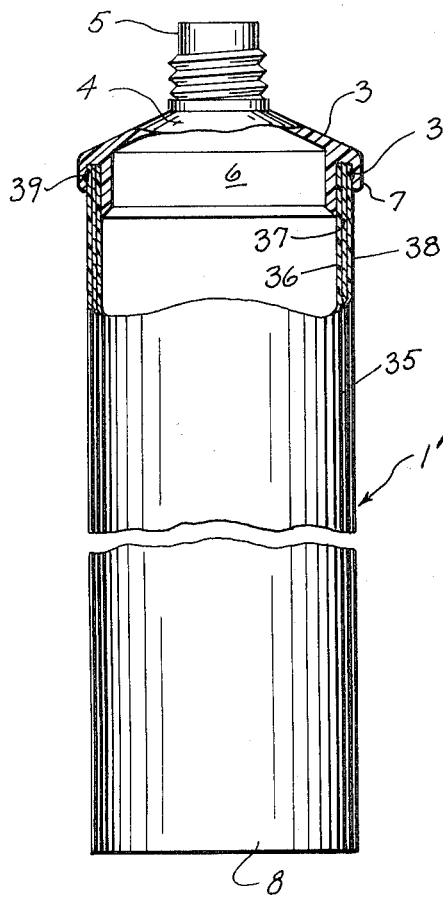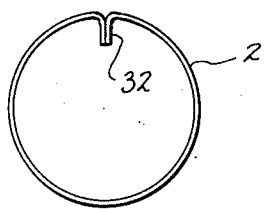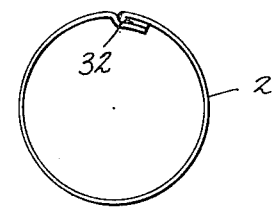

TOOTHPASTE TUBES AND SIMILAR TUBULAR CONTAINERS AND METHODS FOR THEIR MANUFACTURE

BACKGROUND OF THE INVENTION

1. Field.

This invention relates to tubular containers of the type employing a body formed of flexible packaging film which is rolled into tube-form and joined to a closure member inserted into one end of the tube.

2. Description of the Prior Art

The typical tubular container has generally been formed with a metallic body, such as aluminum or the so-called "tin-foil," etc., but there has been increased interest in a tubular container which employs a body of flexible packaging film. A suitable container of this type includes an end closure inserted in one end of a tubular body, with the body joined to the closure member to form the composite container. Tubular containers of this type are used for packaging a variety of fluid materials, e.g., toothpaste, hair tonic, etc., which are dispensed therefrom by squeezing or collapsing the tubular body.

An early prior art container employing a packaging film body is disclosed in U.S. Pat. No. 2,383,230 in which a body formed of heat sealing types of cellulose derivative sheetings is joined to an end member, such as by heat sealing or the use of adhesives. The end closure member shown in this patent has a radial flange which extends only to the outer exterior surface of the tubular body, thus, the closure member covers only the end of the tube body and does not include structure which covers side portions of the tube body at the juncture of the end piece and the tube.

Anothe form of end piece structure for tubular containers is shown in U.S. Pat. Nos. 3,260,410 and 3,295,725. The end piece construction shown in these two patents also provides only for coverage of the end of the flexible film tubular body, in which the end of the tubular body extends up and around the shoulder portions of the end piece. The end piece construction of these two patents is disclosed as preferably being formed by injection molding of the end piece onto one end of the tubular body.

Still another construction is shown in U.S. Pat. No. 3,599,837 and also in pending U.S. patent application Ser. No. 170,173 in the name of Kenneth V. Morrison and Douglas W. Anderson. The end piece structure shown in this patent and in the pending application is formed with a depending flange that is spaced from an annular skirt portion to which the end of the tube is fastened so as to cover a portion of the side of the tube in addition to covering its end. One of the problems which arises with an end piece construction of this type is that the tube must be inserted in a groove between the skirt and the flange, the flange being slightly spaced from the skirt in order to accept the thickness of the tube, and it can be difficult to insert a tube into this groove under the high speed techniques required for large scale manufacture of tubular containers.

The prior art discussed above has not yet offered a solution to the problem of providing a pre-formed end piece closure structure for a tube container in which the end piece includes elements that cover the ends and side portions of the tube and is adapted to enable facile assembly of the end piece and tubular body.

SUMMARY OF THE INVENTION

Our present invention provides a tubular container, and a method for its manufacture, which has an end closure member having a depending skirt and a radially extending flange wherein the flange is adapted to extend beyond the end of a tubular body attached to the skirt of the closure member and is further adapted to be thermally reflowed so as to overlie exterior side wall portions of the tubular body. The reflowing of the radial flange in this fashion is to take place after one end of the tubular body is positioned about the skirt portion of the end closure member. Our invention also provides longitudinal seam constructions for the tubular body in which both edges of the body material are disposed internally or externally of the body. In its presently-preferred form, the closure member is made of a thermoplastic material so as to provide a radial flange which can be repositioned in the desired manner upon the application of heat.

One of the general objects of our invention is to provide a tubular container structure involving a tubular body joined to a plastic end piece construction wherein end and side portions of the tubular body are enclosed by structural elements of the member. Another is to provide a collapsible tube-type container in which end and side portins of the tube body are covered by an end piece member wherein it is not necessary to insert a tubular body into a groove between a skirt and a depending flange member. Still another general object is to provide an end piece closure member for a tubular container of suitable construction which will admit of efficacious manufacture of composite containers by facilitating the joinder of a tubular body to the closure member. A further principal object is to provide a method for the manufacture of a composite tubular container of the type employing a tubular body of flexible packaging film and an end piece closure member having a skirt to which the tubular body is joined and a radially extending flange which extends beyond the boundary of the tubular body an is adapted to be positioned about exterior side portions thereof. Other related main objects are: the provision of new constructions for the longitudinal seam in the body of a tubular container; the provision of a tube container employing a heat seal between an end closure member and exterior portions of the tubular body; and the provision of suitable methods for manufacturing tubular containers of the present invention. A more specific object is to provide the particular details of structure and methods set forth in the claims.

DESCRIPTION OF THE DRAWINGS

FIG. 1 is a partial cross-sectional view of an end piece closure member which forms a part of the present invention;

FIG. 2 is a partial cross-sectional view of the closure member of FIG. 1 attached to a tube body;

FIG. 3 is a side view with parts cut away of a tube and closure member in an intermediate stage of assembly;

FIG. 4 is a side view with parts cut away of the tube and attached closure member of FIG. 3 in their final stage of assembly;

FIG. 5 is a cross-sectional view taken along the plane 5—5 of FIG. 3;

FIG. 6 is a cross-sectional view taken along the plane 6—6 of FIG. 4;

FIGS. 7-9 show three steps in a method for attachment of a closure member and tube according to the present invention;

FIGS. 10 and 11 are partial side views with parts cut away of a second embodiment of the end piece closure member of this invention;

FIG. 12 is a perspective view of a tublar body suitable for the tubular containers of this invention;

FIG. 13 is an end view of the tubular body shown in FIG. 12;

FIGS. 14 and 14A are end views showing another seam construction for the tubular body of FIG. 12;

FIGS. 15 and 15A are end views showing still another seam construction for forming the tubular body of FIG. 12; and FIG. 16 is a side view with parts cut away of another tubular container of this invention.

DESCRIPTION OF PREFERRED EMBODIMENTS

FIGS. 1-9

FIGS. 1-6 illustrate a composite tubular container 1 formed by the combination of a tube body 2 and an end closure member 3 wherein the closure member closes an open end of the tube 2 and provides an opening for dispensing material packaged in the container.

The end closure member 3 includes (see particularly FIG. 3) a conically-shaped main body portion 4, a threaded nozzle 5 extending from one end thereof and an annular skirt 6 extending from the opposite end of the body portion 4. At the point of intersection between the body portion 4 and the skirt 6, flange 7 is formed as an integral portion of the structure of the end closure member 3 and extends radially-outward around the entire circumference of skirt 6. The body portion of the closure member 3 can assume various configurations other than that illustrated herein, but it is to include the essential elements of the annular skirt 6 and radially extending flange 7. The closure member is hollow to provide an opening through which the contents packaged in the container 1 can be dispensed, and the nozzle 5 is normally closed by a cap having internal threads which mate with the external threads shown on the nozzle. The bottom 8 of the tube is closed in any desired manner, preferably by heat sealing. This can be closed before the top of the tube is covered, in which instance the tube is filled through the top, or the top can be closed and the tube filled through the open bottom, in which case the bottom is closed after the filling operation.

The closure members 3 and the tube 2 are joined together by inserting the annular skirt 6 of the closure member into an open enel of the tube 2. The tube 2 is shown in FIGS. 2-11 as being constructed from a sheet of flexible packaging material having three layers firmly joined together, an inner ply 10, a middle ply 11 and an outer ply 12. The inner surface of the tube 2 in the first embodiment now described is to be heat sealable to the annular skirt 6 of the closure member. Thus, the inner ply 10 may comprise a layer of a seat sealable material such as polyethylene, ethylene vinyl acetate copolymer, etc. The remaining layers of the tube will be of various materials depending upon the type of protection needed for the contents to be packaged within the tubular container — e.g., if barrier protection is needed to prevent loss of flavor or other volatile ingredients contained in the contents, the middle ply 11 may be of a nonpermeable material such as aluminum foil, nylon, etc. The outer ply 12, where included, also can be of various materials such as paper which can be easily printed, a transparent coating for the middle layer, or another film intended to provide functional characteristics such as barrier properties. Thus, the tube 2 may include one or more layers selected in accordance with the particular packaging problem at hand, as long as its interior surface is of a heat sealable material. If the tubular container is to be used to package toothpaste, for example, barrier protection in the form of a ply of aluminum foil is often required, in which instance it is necessary to include an inner layer for heat sealability and a layer on the exterior of aluminum foil to protect it. The closure member can be formed of a plastic material that can be heat sealed to the particular material used for the inner surface of the tube 2, or formed of a non-heat sealable plastic material with an annular skirt portion of a different material that is heat sealable to the tube. High density polyethylene is a suitable material for the closure member of the type which can be heat sealed to the tube 2; nylon is an example of a suitable non-heat sealable material for the closure member, which can be formed with an annular skirt of heat sealable polyethylene or ethylene vinyl acetate copolymer.

The annular skirt 6 of the closure member fits within the tube 2 with the top end 13 of the tube butting against the lower surface 14 of the radially extending flange 7, see particularly FIGS. 1 and 2. A heat seal 15 (best seen in FIG. 2) is made between the outer surface of the annular skirt 6 and the inner ply 10 of the tube 2 in order to join the two elements firmly together. The heat seal 15 extends around the circumferential interface between the skirt 6 and inner ply 10 as indicated in FIGS. 5 and 6.

Next, in accordance with the present invention, the radially extending flange 7 of the end closure member is to be repositioned by the use of heat from its initial condition shown in FIGS. 1 and 3 wherein it extends beyond the tube body in a radial direction to its final position shown in FIGS. 2 and 4 wherein it has been moved to assume an axial position in which it overlies exterior side portions of the tube 2. This change in position of the flange 7 is also illustrated in the view of FIGS. 5 and 6, with FIG. 5, showing the flange in its initial radially extending position, and FIG. 6 showing the flange in its final or axial position as shown in FIG. 4. As illustrated in FIG. 2, the flange 7 when in its final condition covers the top end 13 of the tube 2 and the heat seal seam 15 between the tube and the annular skirt 6.

This reforming procedure is shown best in FIGS. 7-9. The tube 2 and closure member 3 are supported by a cylindrical mandrel 20 during the reforming process. The tube and closure members may be joined together before or after the two are supported on the mandrel. The mandrel 20 has a neck portion 21 at its outer end which the skirt 6 of the closure member 3 fits. The diameter of the neck 21 is reduced sufficiently to provide a flush juncture between the outer surface of the skirt 6 and the surface of the mandrel body 20. The closure member of the tubular container is inserted into a heated die 22 that is formed from a heat conductive material and contains electric heating elements 23 controlled to heat the die 22 to a selected temperature that will cause the material of the closure member to become plastic enough to flow. A circular central opening 24 is formed in the die 22 to receive the closure member 3. The opening 24 is beveled at one end to provide a surface that contacts the flange 7 so as to heat the flange to a flowable plastic state. When an upward force is applied to the die 22, the flange 7 is reformed around the top edge 13 of the tube 2 by the inner surface 25 of the die opening 24. The central opening 24 has a slightly larger diameter near its beveled end to encourage a gradual, uniform deformation of the flange 7 during the reforming process. Die temperatures of about 280°F to 325°F are suitable for thermal reflowing of the flange of an end closure member made of high density polyethylene or nylon.

FIGS. 10–11

FIGS. 10 and 11 illustrate a second embodiment of an end closure member 3 in accordance with the present invention. The closure member 3 illustrated therein includes a radially-extending flange 7' that is somewhat thinner and wider than the flange 7 illustrated in the closure member 3 of FIGS. 1–9. In its final condition shown in FIG. 11, flange 7' is also positioned about the upper exterior side portions of the tube body 2 to form the composite container. Whereas the flange 7 of the first embodiment of generally on the order of about one-sixteenth inch to one-fourth inch wide in order to provide the end and upper exterior side portion coverage desired for a container of the present invention, the flange 7' of FIGS. 10 and 11 may be on the order of about one-fourth inch to one-half inch wide to provide additional end and side wall coverage of the tubular body. Also, the thickness of the flange 7' may be less than that of the flange 7 in order to facilitate reflowing thereof to the final condition of FIG. 11 upon the application of heat.

FIGS. 12–15

FIG. 12 illustrates a tube 2 for use as the body portion of the tubular containers of this invention. The tube 2 may be formed from a sheet of flexible packaging material which is rolled into roll-form and joined together along a longitudinal seam 30 in order to hold the tubular shape, the seam 30 generally being made by heat sealing techniques. The end view of FIG. 13 shows a typical prior art construction suitable for the longitudinal seam 30 wherein an inner surface of one edge of the film is joined to an outer surface of the other edge of the film in the so-called "lap" seam, and may be utilized in instances where the inner and outer surface of the film are both heat sealable. Many collapsible tubular containers made of flexible packaging film use the lap seam, and it may be employed with containers of this invention.

FIGS. 14 and 14A illustrate a "fin" seam 31 for use as the longitudinal seam of the tube body 2, in which the inner surface of one edge of the sheet of film material is heat sealed to the inner surface of the other edge; the fin seam may thereafter be folded flat against the exterior of the tube 2 as shown in FIG. 14A. The fin seam 31 has particular utility with containers of this invention that are to be used to package materials which may attack or be affected by one of the layers used in the tube body. Many tubular containers used to package fluoride toothpaste employ an aluminum foil as an intermediate layer in the body to give barrier protection. When the lap seam 30 is used, the inner ply is to be heat sealable and is supposed to cover the edge of the foil layer on the inside of the tube; however, this edge coverage does not always occur, and the exposed aluminum foil can be attacked by the fluoride compounds in the toothpaste. This problem is obviated by use of the fin seam 31 since the aluminum edge of the foil ply is on the outside of the container body and need not be covered by a heat sealable layer of the film.

FIGS. 15 and 15A illustrate a construction for the longitudinal seam of the tube body 2 which may be considered as a reverse or interior fin seam. In this construction, the seam 32 is formed by heat sealing the outer surface of one longitudinal edge of the sheet from which the tube is made to the outer surface of the other longitudinal edge of the sheet of film. The seam 32 is disposed inside of the tubular body 2. After the contiguous exterior longitudinal edge portions have been heat sealed together in this fashion, the interior fin is folded alongside the interior of the tube as shown in FIG. 15A. The longitudinal seam of this construction may be employed when the exterior of the film material from which the tubular body is made is heat sealable or has a heat sealable coating. It is particularly effective when a heat sealable material may not be disposed on the interior surface of the tubular body, such as when the particular contents packaged in the tube would deleteriously affect or be affected by a heat sealable coating or layer on the interior of the tube. In addition, an attractive container is produced which has a minumum of extra material on the outside.

FIG. 16

FIG. 16 illustrates another tubular container 1' made in accordance with the present invention and including a tubular body 35 having an end closure member 3 inserted in an open end thereof. The tubular body 35, instead of being heat sealed to the annular skirt 6, however, is heat sealed to the inner surface of the flange 7 after the flange has been reflowed to its final condition; this joinder is illustrated as an annular heat seal 39. The tube body 35 may also be made of a three layer film including inner layer 36, middle layer 37 and exterior layer 38. In this instance, the exterior layer 38 is to be heat sealable in order to form the annular heat seal 39 between the exterior of the tube body and the interior surface of the flange 7. The construction of the tubular container 1' is particularly effective as a container for packaging materials which would impair a heat sealable layer if the same were in contact with the material inside of the container, or for packaging materials that could be harmed by the presence of heat sealable material along the inside of the container. The longitudinal seam 32 as illustrated above in FIGS. 15 and 15A is particularly effective for use with the container 1'.

A further embodiment, not illustrated in the drawings, can utilize a tubular body made of film having heat sealable layers on both the interior and the exterior of the tubular body; a first annular heat seal seam can then be formed between the inner surfaces of the tube body and the annular skirt 6 of the end closure member 3, such as the seam 15 shown in FIGS. 1–9, and a second annular heat seal seam 39 can be formed between the exterior of the tubular body and the inner surface of the flange, such as the seam 39 as shown in FIG. 16. This provides a double heat sealed joinder between the end closure member and the tubular body for use in those packaging applications in which additional strength may be required in the joinder of the tube and the end closure member.

The exterior seam 39 may also be employed with the end closure member of the construction shown in FIGS. 10 and 11 which has a relatively wider flange 7' and thereby provides additional contact area for the seam.

There has thus been described tubular containers capable of satisfying the objects of this invention. A particular form of an end closure member to be joined to a tubular body is disclosed which includes a flange that is radially-extending in its initial condition and is thermally reflowed to its final condition after combination with a tubular body; in its final condition, the flange is positioned axially of the container to overlie the exterior of the wall portion of the tubular body surrounding an annular skirt of the end closure member. The flange is at least about one-sixteenth to one-half inch wide (measured radially in its initial condition) and provides coverage of the joinder between the tubular body and the end closure member. The tubular body is made of flexible packaging materials and can include one or more similar or dissimilar layers as may be necessary to provide the functional characteristics needed for construction of the container and protection of the contents to be packaged. The material for the tubular body will generally be from about 5 to 20 mils thick, although other thicknesses can be used. The sheet is formed into a tube by a longitudinal seam made by heat sealing contacting portions of a heat sealable surface of the body material; various constructions may be utilized for the longitudinal seam, with two forms of specific seams set forth herein which are of particular utility for containers in which inter-action between the packaged contents and the material of the tubular body can have adverse consequences on either the contents or the tubular body, or both. These specific seam constructions also have utility with tubular containers including an end closure member of a construction other than the particular embodiment disclosed herein.

The method for construction of tubular containers of this invention involves the steps of first combining an end closure member of the construction described herein and a tubular body, the flange of the end closure member being in its radially extending first position until after the two elements are combined, and thereafter applying heat to the flange of the end closure member to cause it to reflow to its final condition in which it overlies the exterior of the wall portion of the tubular body surrounding the annular skirt of the closure member. This particular method provides for facile combination of tubular body with the end closure members in that it does not require the insertion of a tube body into a narrow groove, and can be performed either manually or mechanically at speeds suitable for volume production of the containers. The tubular body is to be joined to the end closure member and this may be accomplished in various fashions: by an annular heat seal seam between the interior surface of a wall portion of the tubular body and a contacting exterior surface of the annular skirt, by an annular heat seal seam between the exterior of a wall portion of the tubular body surrounding the annular skirt and the interior surface of the flange in its final condition disposed axially along the exterior of the tubular body, or a combination of both of the foregoing seam constructions. Tubular containers made with the end closure construction described herein are particularly attractive in that the end of the tubular body and the wall portion thereof surrounding the skirt of the closure member and any heat seal seam between tubular body and the skirt or the flange are concealed. This also provides for protection of both the end and the aforesaid wall portion of the tubular container.

The end closure member includes a dispensing member extending from the main body portion thereof on the opposite side from the depending annular skirt. The end closure member is hollow to provide a dispensing passageway through which contents packaged in the body of the tubular container are dispensed, the dispensing member being enclosed in any suitable fashion such as by a threaded cap. Dispensing of the contents of the tubular body may be accomplished by collapsing the tubular body, in the typical fashion for withdrawing toothpaste from a tube.

Our present invention as described hereinabove with respect to a number of specific embodiments of its various facets. It is contemplated that those skilled in the art may be able to devise changes in the embodiments illustrated herein and provide other embodiments, all of which will remain within the true spirit and scope of our invention.

We claim:

1. A method for the manufacture of a tubular container having a collapsible tubular body of flexible packaging material and an end closure member of thermoplastic material inserted in an end of the tubular body and defining a dispensing opening, comprising the steps of:
   1. combining a collapsible tubular body with an end closure member of the type having a main body portion, an annular skirt depending therefrom and a radially extending flange, by arranging the tubular body to have a wall portion extending around the annular skirt of the closure member, the annular skirt of the end closure member being shorter than the tubular body to extend only partly into the tubular body, and with the flange of the closure member extending beyond the said wall portion of the tubular body, and
   2. heat sealing the collapsible tubular container to the annular skirt of the end closure member, and thereafter,
   3. heating the flange of the end closure member and reflowing it to a final condition in which it is positioned axially of the container to overlie the exterior of the said wall portion of the tubular body, the heating continuing during reflowing of the flange.

2. A method for the manufacture of a tublar container having a collapsible tubular body of flexible packaging material and an end closure member of thermoplastic material inserted in an end of the tubular body and defining a dispensing opening, comprising the steps of:
   1. combining a collapsible tubular body with an end closure member of the type having a main body portion, an annular skirt depending therefrom and a radially-extending flange, by arranging the tubular body to have a wall portion extending around the annular skirt of the closure member, the annular skirt of the end closure member being shorter than the tubular body to extend only partly into the tubular body, and with the flange of the closure member extending beyond the said wall portion of the tubular body, 2. heat sealing the collapsible tubular container to the annular skirt of the end closure member, and thereafter,
3. heating the flange of the end closure member and reflowing it to a final condition in which it is positioned axially of the container to overlie the exterior of the said wall portion of the tubular body, the heating continuing during reflowing of the flange, and
4. heat sealing the collapsible tubular body to the radially extending flange of the end closure member after heating and reflowing the flange to its final condition.

* * * * *

PO-1050
(5/69)

UNITED STATES PATENT OFFICE
CERTIFICATE OF CORRECTION

Patent No. 3,817,427　　　　　　Dated　June 18, 1974

Inventor(s) Robert O. Neff, Kenneth V. Morrison & William D. Groechel

It is certified that error appears in the above-identified patent and that said Letters Patent are hereby corrected as shown below:

Column 3, line 54, "enel" should be --end--. Column 4, line 59, after "end" insert --around--. Column 5, line 26, "of" (first occurrence) should be --is--. Column 6, line 57, "surfaces" should be --surface--. Column 7, line 20, "caninclude" should be --can include--. Column 7, line 50, "members" should be --member--.

Signed and sealed this 3rd day of December 1974.

(SEAL)
Attest:

McCOY M. GIBSON JR.　　　　　　C. MARSHALL DANN
Attesting Officer　　　　　　　Commissioner of Patents